United States Patent [19]
Hoag et al.

[11] 3,860,887
[45] Jan. 14, 1975

[54] ELECTRICALLY EXCITED HIGH POWER FLOWING GAS DEVICES SUCH AS LASERS AND THE LIKE

[75] Inventors: Ethan D. Hoag, Boston; Edward V. Locke, Rockport, both of Mass.

[73] Assignee: Avco Corporation, Cincinnati, Ohio

[22] Filed: Oct. 20, 1972

[21] Appl. No.: 299,415

[52] U.S. Cl. ............... 331/94.5 PE, 331/94.5 G
[51] Int. Cl. .............................................. H01s 3/00
[58] Field of Search .................................... 331/94.5

[56] References Cited
UNITED STATES PATENTS
3,577,096   5/1971   Bridges et al. .............. 331/94.5
3,702,973   11/1972  Daugherty et al. ........... 331/94.5

OTHER PUBLICATIONS
Ben-Yosef et al., "Electrode Configuration... $CO_2$ Laser," Journal of Physics, Part E, Sept., 1971, pp. 708,709.
Laurie et al., "Folded Path Atomspheric Pressure $CO_2$ Laser," IEEE, Journal of Quantum Electronics, August 1970, 530–532.
Turgeon, "High Repetition Rate, TEA–$CO_2$ Laser," IEEE, Journal of Quantum Electronics, 495–497.

Primary Examiner—Ronald J. Stern
Assistant Examiner—Conrad Clark
Attorney, Agent, or Firm—Charles M. Hogan, Esq.; Melvin E. Frederick, Esq.

[57] ABSTRACT

A high-power flowing device such as a laser, for example, wherein an active gaseous lasing medium flowing through the working region of the device is excited to provide stimulated emission of radiation by ionizing radiation such as an electron beam and by an electric field. The electron beam is directed through the gaseous medium in the working region and the electric field is provided through that portion of the gaseous medium including the electron beam by means of oppositely disposed electrodes at least the majority of which are spaced from the walls defining the working region a distance greater than the gas boundary layer that exists during flow of the gaseous medium through the working region. Additionally, the electrodes are preferably arranged and adapted such that they are effectively divergent in the direction of gas flow. Providing electrode divergence in the direction of gas flow is helpful in keeping the $E/n$ ratio constant and providing cross flow of gas on the electrodes. Making the electrodes asymmetric with respect to each other in the case of a laser device is helpful in preventing lensing effects.

11 Claims, 10 Drawing Figures

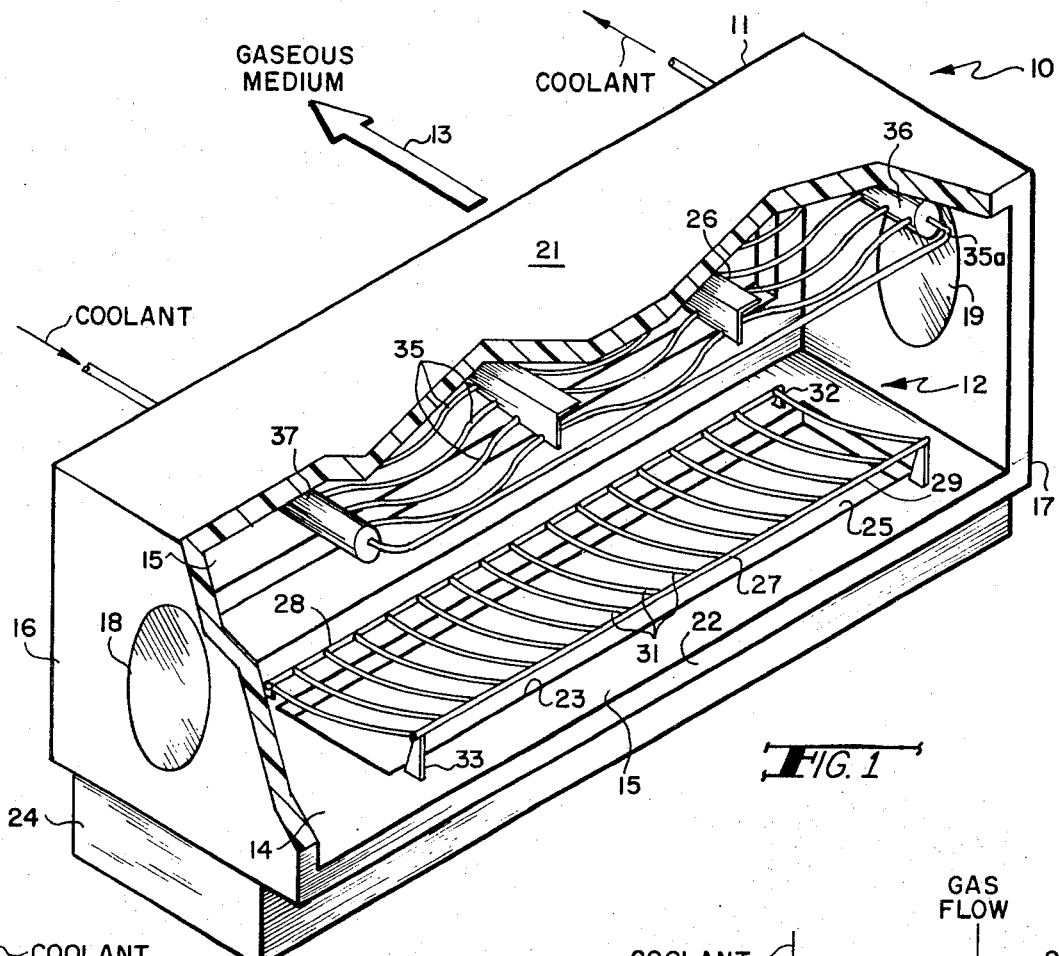
FIG. 1
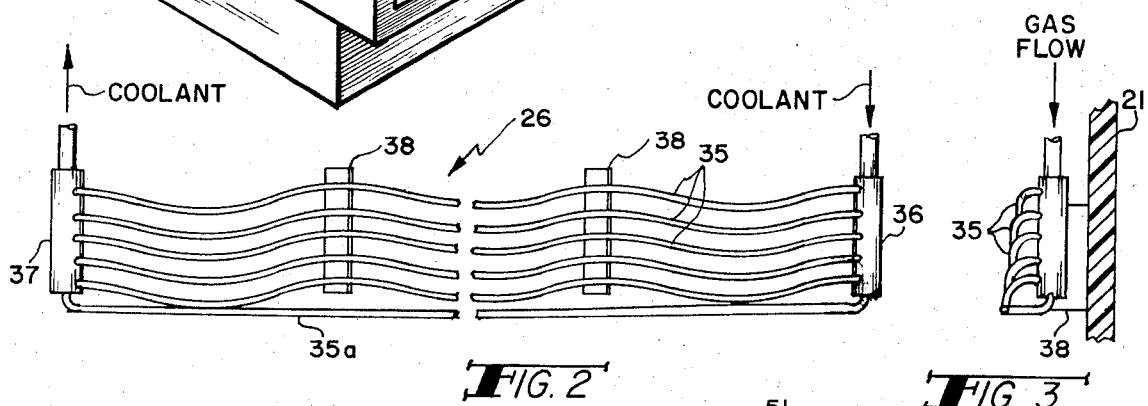
FIG. 2
FIG. 3
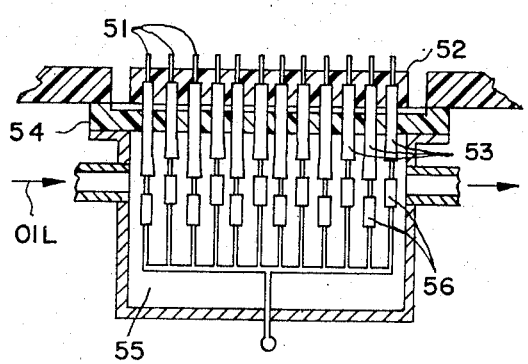
FIG. 9
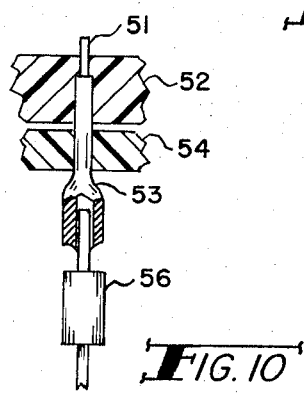
FIG. 10

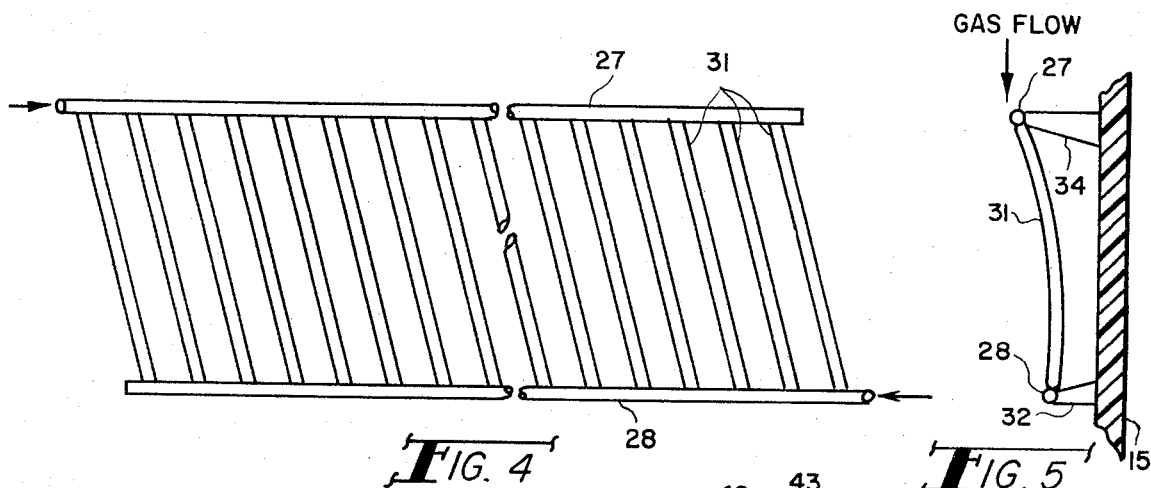
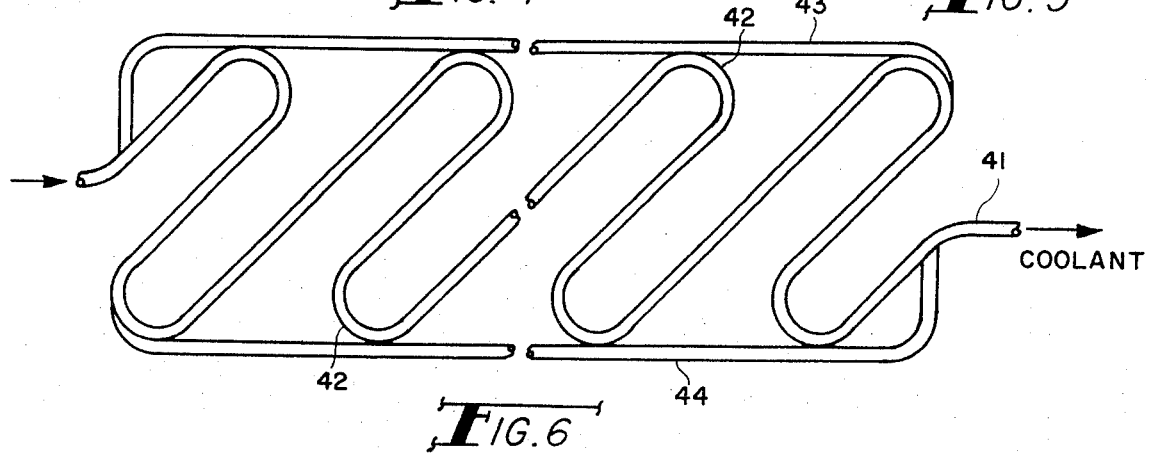
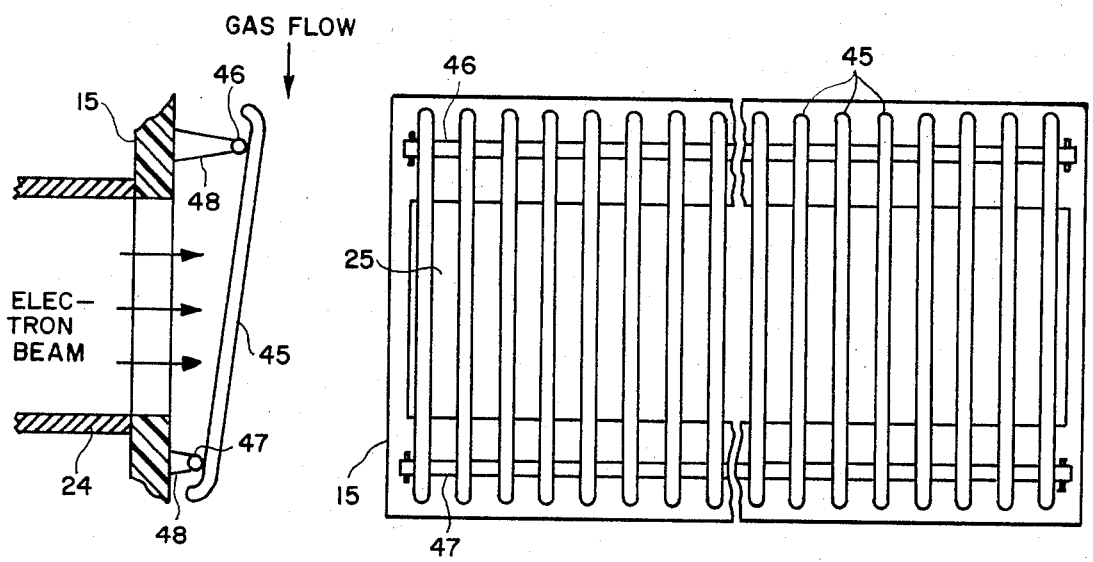

ELECTRICALLY EXCITED HIGH POWER FLOWING GAS DEVICES SUCH AS LASERS AND THE LIKE

This invention relates to high power flowing gas devices and more particularly to lasers wherein the gaseous lasing medium is excited to provide stiumlated emission of radiation by the combined action of ionizing radiation and an electric field.

There has been much development in the gas laser art principally in recent years leading to higher power and more efficient laser configurations. Such gases as neon, krypton, argon, helium and mixtures of these and others such as carbon dioxide and nitrogen have been shown to provide laser oscillation in a broad area of the electromagnetic spectrum. A wide range of gases and pressures are used in present-day lasers.

The mechanics of most gas lasers including flowing gas lasers are currently well-known. A great deal of attention has been paid recently to the excitation of a lasing gas to an energy level capable of emitting photons and thereby participating in stimulated emission of coherent light within a laser cavity as a result of energy preferentially transferred to the lasing gas through near-resonant collision with a vibrationally excited energizing gas. One type of gas laser which has received a great deal of attention is the nitrogen-carbon dioxide laser. In this type of gas laser, the nitrogen is excited to the first vibrational level, and it transfers energy into the upper laser level of carbon dioxide preferentially, so as to provide a population inversion which supports laser emission. The emission of photons by the carbon dioxide causes the molecules thereof to assume the energy of the lower laser level and molecules in this energy level rapidly decay via gas collisions to the ground state.

Thus, in the present state of the high power gas laser art, lasing (which is the coherent stimulated emission of quanta of light energy) of one substance results from that substance being brought to a high, non-equilibrium energy state as a result of collisions with an energizing gas excited to a vibrational energy level which closely matches and energy level of the lasing substance. the method of exciting the energizing gas may vary in accordance with the particular design parameters of a given laser. For instance, electric excitation may be used in any of several forms. One well-known form is radio frequency excitation; another form is direct current plasma excitation; and a third known form is microwave excitation. A fourth form utilizes an electron beam. Additionally, it is possible to excite the energizing gas by causing it to absorb intense light of a frequency matched to the spacing of the low-lying vibrational energy levels of the energizing gas.

For a further discussion of a laser capable of developing very high powers, see, for example, U.S. Pat. No. 3,577.096 issued May 4, 1971. See, also, U.S. Pat. application Ser. No. 72,982 filed Sept. 17, 1970, u.S. Pat. No. 3,702,973 and assigned to the same Assignee as this application. U.S. Pat. No. 3,577,096 discloses a transverse discharge type high power flowing gas laser; U.S. Pat. application, Ser. No. 80,152, new U.S. Pat. No. 3,713,030, of common assignment with the present invention discloses a gas laser wherein the gas is thermally heated and thereafter suddenly cooled by passing it through a rapid expansion nozzle to freeze the vibrational energy states; and U.S. Pat. No. 3,702,973 of common assignment with the present invention discloses a transverse discharge high power flowing gas device using an electron beam.

In electron beam excited flowing gas devices of the type disclosed in U.S. Pat. No. 3,702,973, the mass flow is sufficient to carry away all of the waste energy deposited in the gas by the electrical discharge. Typically, the electrical discharge current density vector is substantially transverse to the gas flow vector and to the optical axis. In such devices, we have found that flat solid cathodes are not satisfactory because the discharge is displaced in the downstream direction where it cannot effectively excite the gas in the desired region such as, for example, the working region and/or optical cavity. This effect occurs at least in part due to the fact that the $E/n$ ratio (the ratio of the electric field divided by the gas density) in the cathode fall region tends to be much higher than the $E/n$ ratio at the positive column, typically high enough to cause substantial local self-ionization. The self-ionization which is largely controlled by local conditions is carried downstream by the gas flow. Furthermore, and more importantly, since the aforementioned local regions of ionization have little or no velocity relative to the gas flow, they become heated and this increases the $E/n$ ratio thereby causing still further self-ionization. The above-described effects in addition to resulting in distortion of the positive column causes unstable discharge behavior and arcing.

Electrodes in accordance with the present invention which extend through the gas boundary layer and into the main stream of gas flowing through the working region eliminates the aforementioned disadvantages associated with the prior art electrodes. Thus, electrodes in accordance with the invention provide local stationary regions of high $E/n$ ratios appropriate to satisfactory electrode operation. These local stationary regions are not carried downstream because the high local fields are dominated by stationary geometric effects rather than moving gas effects. Further, since the local regions provided by electrodes in accordance with the invention are stationary, they have as compared to the prior art a high velocity relative to the gas flow and, hence, are more effectively cooled by the gas flow. It is accordingly an object of the present invention to provide an improved gas laser.

In one aspect of the present invention comprising a pair of oppositely positioned electrodes, the cathode electrode comprising a plurality of pins projecting into the main stream of gas flowing between the electrodes.

In another aspect of the present invention, reticulated electrodes may be provided comprising a plurality of electrically connected narrow rod-like portions in spaced relationship and disposed in the main stream of gas. The orientation of the rods may vary considerably with respect to the axis or direction of flow and/or with respect to the axis transverse to the direction of flow. However, more freedom is permissible with respect to orientation with anodes than with cathodes. With anodes, virtually any orientation is acceptable whereas with cathodes, it is important that the angle between the flow direction and the axes of the majority of the rodlike portions is at least about 45°. This difference between anodes and cathodes is caused mainly by the difference in anode drops and cathode drops as defined and explained in some detail, for example, in "Gaseous Conductors: Theory and Engineering Applications," N.Y., Dover Publications, 1958, by James D. Cobine. With cathodes, the local self-ionization is much more pronounced due to the higher cathode drop. Where the rods or rod-like portions are generally disposed at right angles to the direction of flow, they preferably define a plane (not necessarily flat) that is closer to the wall at its downstream end than its upstream end.

In another aspect of the present invention, the configuration of the reticulated electrodes are asymmetric in the case of a laser device to prevent lensing effects. Thus, the anode electrode may utilize rod-like members (adapted to receive a coolant for high power devices) more or less orientated in the direction of flow and the cathode electrode may utilize rod-like members or a more or less wavey configuration oriented more or less transverse to the direction of flow.

It is another object of the invention to provide a gas laser having improved electrodes.

It is another object of the invention to provide a gas laser having electrodes that provide improved discharge characteristics.

A still further object of the invention is to provide a gas laser having improved operating characteristics.

A further object of the invention is to provide an electrically excited flowing gas laser capable of being operated at high power levels than heretofore possible wherein the discharge is stable and not prone to arcing.

a still further object of the invention is to provide an electron beam pumped flowing gas laser having electrodes disposed in the main stream of gas flow for producing an electrical discharge.

A still further object of the invention is to provide a high power electron beam pumped flowing gas device having electrodes for producing an electric discharge in the gas disposed beyond the gas boundary layer and formed of tubular members through which a coolant is circulated and which are disposed at predetermined angles with respect to the direction of gas flow and/or the optical axis.

The novel features that are considered characteristic of the invention are set forth in the appended claims; the invention itself, however, both as to its organization and method of operation together with additional objects and advantages thereof will best be understood from the following description of a specific embodiment when read in conjunction with the accompanying drawings, in which:

FIG. 1 is a perspective view with parts broken away illustrating electrode means in accordance with the invention in a laser device;

FIGS. 2 and 3 are respectively enlarged top and side views of the cathode electrode shown in FIG. 1;

FIGS. 4 and 5 are respectively enlarged top and side views of the anode electrode shown in FIG. 1;

FIG. 6 is a top view illustrating an alternate anode configuration similar to that of FIG. 4;

FIGS. 7 and 8 are respectively enlarged top and side views illustrating a further anode configuration in accordance with the invention;

FIG. 9 is a top view of a cathode electrode in accordance with the invention comprising a plurality of pins; and FIG. 10 is a sectional side view taken on line 10—10 of FIG. 9.

Referring to FIG. 1, there is shown by way of example a laser device incorporating electrodes in accordance with the invention. While the invention will be described in connection with a laser device, it is to be understood that the invention is not so limited and finds equal application in devices that while generally similar in construction, are used for different purposes such as, for example, producing ozone or other chemical reactions wherein an electrical discharge in utilized.

The laser generally indicated by reference character 10 comprises a housing or suitable means 11 defining a working region 12. A gaseous lasing medium 13 such as argon, xenon, krypton, or mixtures of $CO_2$, $N_2$ and He is supplied to the working region via gas inlet 14 and exhausted via gas outlet 15. The working region 12 is shown as being generally rectangular only for purposes of convenience. The working region comprises oppositely disposed side walls 16 and 17 of a suitable electrically nonconductive material adapted to receive and support mirrors 18 and 19 in conventional manner, or alternately, as shown and described in U.S. Pat. application, Ser. No. 249,607 entitled "Aerodynamic Laser Window" in the name of Ethan D. Hoag filed May 2, 1972 and/or U.S. Pat. application, Ser. No. 286,724 entitled "Laser Mirror Positioning Apparatus" in the name of Jacob L. Zar filed Sept. 6, 1972, now U.S. Pat. No. 3,753,150 and of common assignment with the present invention.

Oppositely disposed top and bottom electrically nonconductive walls 21 and 22 are attached to the side walls, bottom wall 22 being provided with an opening 23 extending substantially the distance between mirrors 18 and 19 to receive electron gun apparatus 24 for introducing a broad area electron beam into the working region through an imperforate electron window 25. The electron beam which is generated in the highly evacuated electron gun apparatus is effective to ionize the high pressure gas in the working region 12 as and for the purposes pointed out hereinafter.

In the working region the energy of the free electrons produced in the gas therein by ionizing action of the electron beam is maintained at a predetermined level by an electric field between oppositely disposed electrodes 26 and 27 which may be coupled to a high voltage direct current source (not shown). Such a source may comprise capacitive discharge means charged by a power supply and actuated by suitable trigger or timing circuits.

The above-mentioned U.S. Pat. application, Ser. No. 72,982 discusses fully the manner in which a laser beam may be amplified or produced in the working region, hence, it will not be repeated here in further detail. For a further discussion of the manner of producing the electron beam, electric field and the laser beam and the construction and operation of components therefor, reference is made to the above-mentioned U.S. Pat. application, Ser. No. 72,982.

Upon passage through the gas tight electron window 25 of the electron gun apparatus 24, electrons pass through reticulated anode electrode 27 carried by and spaced from wall 15 over the electron window 25. Anode 27 is preferably provided with a cross sectional area essentially that of the cross section of the working region extending between the mirrors 18 and 19 and parallel to the direction of gas flow and is disposed in the main stream of the gas flowing through the working region with an orientation such that its downstream end is closer to wall 15 than its upstream end. The aforementioned divergence of the reticulated anode electrode 27 (as well as the similar divergence of the cathode electrode 26) permits the gas flowing through the working region to flow over and cool each portion of the electrode thereby reducing any tendency of heating at the electrode to substantially produce ionization of the working medium over and above that desired and provided by the electron beam. To further reduce the possibility of undesirable heating especially in high power applications, the electrodes are preferably constructed of hollow copper tubing and coupled to a pressurized source of coolant such as water.

Anode 27 as shown in FIGS. 1, 4 and 5 comprises hollow header or manifold members 28 and 29 connected by hollow copper connector tubes 31 spaced one from another along the length of the manifold. The connector tubes 31 through which coolant flows may be disposed at an angle to the direction of flow of gas through the working region. While the orientation of the connector tubes is not critical, an angle of generally about 45° has been found satisfactory for laser applications. Orientation of narrow electrode members parallel to the optical axis is preferably avoided. As best shown in FIG. 1, coolant may be supplied to the anode electrode via a copper supply pipe as the like 32 and exhausted via a copper pipe or the like 33. The anode electrode may be fixedly attached to wall 15 via suitable supports or spacers 34. Electrical connection is conveniently made via the copper water pipe. The orientation of the connector tubes at an angle to the direction of gas flow as previously described is advantageous in reducing lensing or distortion of the optical qualities of the medium and as compared to the provision of long slender parallel members, improves beam quality. The spacing of the connector tubes while still providing a uniform discharge not only permits cooling by gas flow as noted herein above, but also presents minimim interference with the electron beam which passes through the anode electrode and into the working region where it ionizes the gas flowing therethrough.

The cathode electrode 26 as shown in FIGS. 1, 2 and 3 is fixedly carried as by supports attached to opposing wall 21 and is preferably provided with a cross sectional area equal to that of the anode and similarly disposed as and for the same purposes as explained in connection with the anode electrode. Thus, the anode and cathode electrodes diverge with respect to each other in the direction of gas flow. However, the cathode electrode 26 as shown is comprised of a plurality of copper tubing members 35 spaced one from another which are disposed substantially transverse to the direction of gas flow and, hence, are generally parallel to the optical axis. It is significant to note, however, that the long, narrow tubing defining the aforementioned members 35 is not straight, but is provided with a plurality of continuous curves as it transverses the length of the working region intermediate the mirrors to provide a "wavey" electrode as best illustrated in FIG. 2. The "wavey" members 35 are coupled to coolant inlet and outlet header 36 and 37. The electrode 26 is fixedly attached to wall 21 by supports 38. Member 35a, where located outside the mode of the laser beam may be straight as shown.

For purposes of improving beam quality in laser devices, it is advantageous that the configuration of the anode and cathode electrodes be asymmetric with respect to each other as illustrated by way of example in FIG. 1. It is also advantageous that electrodes for laser devices of the cathode type shown in FIGS. 2 and 3 not present long slender portions parallel to the optical axis in the mode of the laser beam. Other configurations will, of course, be obvious to those skilled in the art and are included within the scope of the invention.

Whereas in some cases, the supply of a coolant to the anode electrode may be optional, generally provision of a coolant to the cathode is more often necessary. In high power operation, the provision of a coolant to both electrodes is highly recommended, if not essential. This reduces any tendency of the electrodes to cause undesirable ionization and in the case of an electrode adjacent the electron window, maintenance of a low operating electrode temperature reduces heating of the electron window which may result in early or unanticipated failure of the electron window.

Whereas the electrodes are typically substantially planar to facilitate fabrication, they may be curved in the direction of gas flow (see FIG. 5) to facilitate the use and passage of a circular laser beam in the optical cavity. Further, whereas sharp corners on the electrodes are to be avoided because of their tendency to cause arcing, portions of the electrodes such as, for example, member 35a outside the mode of the laser beam in the optical cavity need not necessarily be disposed at angles or be curved. However, because of heating of the medium as it passes through the working region, divergence of the electrodes as described herein above is a practical requirement if the $E/n$ ratio is to be maintained constant. As the medium flows through the working region and is heated by the electrical discharge, its density decreases. Thus, in order to maintain the quotient of the electric field divided by density ($E/n$) at a constant value, the electrodes must diverge at the same rate as the density decreases to maintain the $E/n$ ratio constant. The uniformity of the discharge in the working region is dependent on the $E/n$ ratio, and, of course, to the extent $E/n$ is not constant, the discharge will not be uniform. Since the discharge produces the population inversion in lasers, it will be obvious that uniformity of the discharge over large volumes is desirable and beam quality will be adversely affected to the extent that the discharge is not uniform. Accordingly, it will not be seen that divergence of the electrodes is an important feature.

In lasers having a high flow rate, due to the tendency of the discharge to be blown downstream, it may be found advantageous if the electrodes are offset a distance sufficient to locate the discharge at the desired location in the working region.

Direction attention now to FIG. 6, there is shown an alternate electrode configuration generally similar to that shown in FIG. 4. As shown in FIG. 6, copper tubing 41 adapted to receive and exhaust coolant is formed to provide a series of relatively short loops 42 disposed at an angle of about 45°. The spacing of the legs forming the loops is not critical and need only be such as to provide in combination with the opposing electrode a uniform discharge in the working region. Steel reinforcing rods 43 and 44 may be brazed as shown to the bights of the loops and to the end portions of the tubing. The electrode may be divergently supported in spaced relationship from its supporting wall by suitable supports (not shown) attached to both the steel rods and the wall, taking into consideration the necessity for compensating for expansion and contraction of the various components.

FIGS. 7 and 8 show a further modification wherein the electrode is provided with connector portions 45 disposed parallel to the direction of gas flow and, hence, transverse to the optical axis in the case of a laser. Where heating is not significant the connector portions 45 may be formed of small steel rods brazed or welded adjacent their ends to parallel main rods 46 and 47. Standoffs 48 welded to the main rods 46 and 47 support the electrode in spaced relationship from its wall. The ends of the connector rods 45 are preferably bent as shown to present curved surfaces at the ends of the connector rods. This is helpful in preventing arcing.

FIGS. 9 and 10 illustrate a pin-type electrode that has operated satisfactorily. The electrode in this case may comprise as shown small diameter tungsten pins 51 or the like sealably imbedded in an electrically nonconductive member 52 of a suitable material such as ceramic or the like and carried by an appropriate wall defining in part the working region.

The pins may conveniently be swaged into copper tubes 53 which extend through a further electrically nonconductive member 54 into a heat exchanger compartment 55. Oil may be supplied to and exhausted from the heat exchanger compartment 55 to provide both cooling and electrical insulation. the pins are all electrically connected in parallel to the power supply. Suitably sized ballast resistors 56 may be connected in series with the pins when necessary.

The various features and advantages of the invention are thought to be clear from the foregoing description. Various other features and advantages not specifically enumerated will undoubtedly occur to those versed in the art, as likewise will many variations and modifications of the preferred embodiments illustrated, all of which may be achieved without departing from the spirit and scope of the invention as defined by the following claims.

We claim:

1. In apparatus for producing a controlled discharge for providing molecular excitation of a gaseous working medium including means having walls defining a cavity having a working region disposed therein, gas supply means for producing a flow of a gaseous working medium through said working region, said working region being generally rectangular in a plane parallel to the direction of flow of said medium, means for providing ionizing radiation in said working region and ionizing said working medium flowing through said working region, the combination comprising:
   a. first and second oppositely positioned electrodes each having a length and width dimension corresponding substantially to that of said rectangular working region for applying aa voltage across substantially all of said working region, said electrodes each being reticulated to permit the passage of a gas through them, said electrodes being disposed within said means defining said cavity in spaced relationship thereto and being positioned and formed whereby a portion of said working medium adjacent said electrodes flows through each of said electrodes, the effective area encompassed by each said electrode conforming substantially to the area defined by said working region intermediate said electrodes, said electrodes comprising a plurality of narrow substantially elongated portions spaced one from another and said electrodes effectively diverge with respect to each other in the direction of flow of said working medium.

2. In apparatus for producing a controlled discharge for providing molecular excitation of a gaseous working medium including means having walls defining a cavity having a working region disposed therein, gas supply means for producing a flow of a gaseous working medium through said working region, said working region being generally rectangular in a plane parallel to the direction of flow of said medium, means for providing ionizing radiation in said working region and ionize said working medium flowing through said working region, the combination comprising:
   a. first and second oppositely positioned electrodes each having a length and width dimension corresponding substantially to that of said rectangular working region for applying a voltage across substantially all of said working region, said electrodes each being reticulated to permit the passage of a gas through them, said electrodes being disposed within said means defining said cavity in spaced relationship thereto and being positioned and formed whereby a portion of said working medium adjacent said electrodes flows through each of said electrodes, each electrode comprising a plurality of narrow substantially elongated portions in spaced relationship, the spacing between said first and second electrodes effectively increases in the direction of flow of said working medium and the disposition of the narrow portions of said first electrode is asymmetric with respect to the disposition of the narrow portions of said second electrode.

3. The combination as defined in claim 2 wherein said first and second electrodes are provided with coolant passages, and including means for flowing a coolant through said electrodes.

4. In high power laser apparatus, the combination comprising:
   a. means defining a cavity having imperforate walls and having an elongated generally rectangular working region disposed therein;
   b. gas supply means for producing a flow of a gaseous lasing medium through said working region, said working region having a first dimension normal to the direction of flow of said medium and a second dimension less than that of said first dimension parallel to the direction of flow of said medium;
   c. first means providing ionizing radiation in said working region and ionize said lasing medium in said working region; and
   d. second means for applying a voltage across substantially all of said working region comprising a pair of oppositely positioned electrodes each reticulated to permit the passage of a gas through them, said electrodes each having a generally rectangular configuration in a plane parallel to the direction of flow of said medium, said electrodes being disposed within said means defining said cavity in spaced relationship thereto and being positioned and formed whereby a portion of said working medium adjacent said electrodes flows through each of said electrodes, the effective area encompassed by each said electrode conforming substantially to the area defined by said working region intermediate said electrodes, said electrodes comprising a plurality of narrow substantially elongated portions spaced one from another and said electrodes effectively diverge with respect to each other in the direction of flow of said working medium.

5. the combination as defined in claim 4 wherein each said electrode comprises a plurality of narrow substantially elongated portions in spaced relationship, the spacing between said first and second electrodes effectively increases in the direction of flow of said working medium and the disposition of the narrow portions of said first electrode is asymmetric with respect to the disposition of the narrow portions of said second electrode.

6. The combination as defined in claim 5 wherein said first and second electrodes are provided with coolant passages, and including means for flowing a coolant through said electrodes.

7. In high powered laser apparatus the combination comprising:
   a. gas supply means for producing a flow of a gaseous laser medium having an upper and lower laser state;
   b. means having imperforate walls defining a cavity including a working region for receiving said laser medium from said gas supply means and through which said flow passes;
   c. first means for generating inoizing radiation;
   d. second means for introducing said ionizing radiation into said cavity and through an imperforate wall of said cavity and produce a substantially uniform spatial distribution of secondary electrons in said medium in said working region, said secondary electrons having an average energy insufficient to produce a population inversion in said medium; and
   e. third means for controlling the electron temperature of said secondary electrons in said medium to substantially uniformly throughout said working region increase their average energy without substantially increasing the density thereof by self-regenerative ionization aand produce a population inversion in said medium in said working region, said third means includes electrode means for providing an electric field in said working region, said electrode means comprising a first reticulated electrode spaced from the wall through which said radiation is introduced and through which said first electrode said radiation and said laser medium passes, and a second reticulated electrode oppositely disposed to said first electrode spaced from the opposite wall of said cavity and through which said second electrode said laser medium also passes, each said electrode comprising a plurality of narrow substantially elongated portions in space relationship, the spacing between said first and second electrodes effectively increases in the direction of flow of said working medium and the disposition of the narrow portions of said first electrode is asymmetric with respect to the disposition of the narrow portions of said second electrode.

8. The combination as defined in claim 7 wherein said first and second electrodes effectively diverge with respect to each other in the direction of flow of said laser medium whereby upon an increase in temperature of said laser medium as it flows through said working region the gradient of said electric field remains substantially constant.

9. The combination as defined in claim 8 wherein said first and second electrodes are provided with coolant passages, and additionally including means for flowing a coolant through said electrodes to maintain them each at a predetermined temperature.

10. In a flowing gas laser device, the combination comprising:
    a. laser enclosure means having walls defining a laser cavity through which flows an active gaseous medium capable of being electrically excited to provide stimulated emission of radiation, said laser enclosure means having a gas inlet for receiving said medium and a gas outlet for exhausting said medium;
    b. laser window means for permitting the transmission of stimulated emission of radiation from said laser enclosure means;
    c. radiation generating means for generating a broad area beam of ionizing radiation;
    d. radiation window means for receiving and permitting the transmission of said broad area beam into the main stream of gas flowing through said laser cavity; and
    e. electrode means for applying a voltage across said main stream of gas flowing through said laser cavity, said electrode means being carried by said laser enclosure means and extending into said main stream of gas wherein said gas flows through and cools said electrode means, the effective area encompassed by said electrode means conforming substantially to that of said laser cavity, said electrode means comprising a plurality of narrow substantially elongated portions spaced one from another and said electrode means effectively diverges in the direction of flow of said medium.

11. In a flowing gas laser device, the combination comprising:
    a. laser enclosure means having walls defining a laser cavity through which flows a main stream of an active gaseous medium capable of being electrically excited to provide stimulated emission of radiation, said laser enclosure means having a gas inlet for receiving said medium and a gas outlet for exhausting said medium;
    b. laser window means for permitting the transmission of stimulated emission of radiation from said laser enclosure means;
    c. means for generating a broad area beam of free electrons;
    d. electron window means for receiving and permitting the transmision of said broad area beam into the main stream of gas flowing through said laser cavity intermediate said gas inlet and said gas outlet; and
    e. means for applying a voltage across said main stream of gas flowing through said laser cavity intermediate said gas inlet and said gas outlet, said means comprising support means carried by said enclosure means and extending into said cavity and reticulated electrode means carried by said support means, said electrode means being spaced from said walls defining said laser cavity a distance greater than any gas boundary layer that exists during flow of said medium through said laser cavity whereby said medium flows through and cools said electrode means, said electrode means comprising a plurality of narrow substantially elongated portions in spaced relationship, said electrode means effectively diverging in the direction of flow of said medium and the disposition of opposed narrow portions is asymmetirc with respect to each other.

* * * * *

PO-1050
(5/69)

UNITED STATES PATENT OFFICE
CERTIFICATE OF CORRECTION

Patent No. 3,860,887           Dated January 14, 1975

Inventor(s) Ethan D. Hoag and Edward V. Locke

It is certified that error appears in the above-identified patent and that said Letters Patent are hereby corrected as shown below:

Column 3, line 13, for "or" (first occurrence), read --of--; Column 3, line 26, for "a", read --A--; Column 4, line 61, after "gas" insert --13--; Column 5, line 21, for "as" read --or--; Column 6, line 41, for "not" read --now--; Column 7, line 22, for "the" read --The--; Column 7, line 50, for "aa" read --a--; Column 8, line 66, for "the" read --The--; and Column 9, line 35, for "aand" read --and--.

Signed and sealed this 6th day of May 1975.

(SEAL)
Attest:

RUTH C. MASON
Attesting Officer

C. MARSHALL DANN
Commissioner of Patents
and Trademarks